United States Patent [19]

Heescher et al.

[11] 4,375,232
[45] Mar. 1, 1983

[54] INSULATION OF SHED-LIKE BUILDINGS

[76] Inventors: Felix Heescher, Beuergern, Fed. Rep. of Germany; Claus J. Caroe, Snekkerstern, Denmark

[21] Appl. No.: 201,994

[22] Filed: Oct. 29, 1980

[30] Foreign Application Priority Data

Oct. 30, 1979 [DE] Fed. Rep. of Germany ....... 2943743
Mar. 6, 1980 [DE] Fed. Rep. of Germany ....... 8006056

[51] Int. Cl.³ .............................................. A01G 9/14
[52] U.S. Cl. ..................... 160/84 R; 47/17; 248/95
[58] Field of Search ................... 47/17, 28; 52/71, 64, 52/13, 302, 63; 160/84 R; 248/95; 428/178, 180, 120

[56] References Cited

U.S. PATENT DOCUMENTS

| | | | |
|---|---|---|---|
| 2,894,573 | 7/1959 | Rosenfeld | 160/84 R |
| 3,100,950 | 8/1963 | Heuer | 160/84 R |
| 3,481,073 | 12/1969 | Yoshida | 160/84 R |
| 4,083,395 | 4/1978 | Romano | 160/84 R |
| 4,095,639 | 6/1978 | Ryan . | |

FOREIGN PATENT DOCUMENTS

| | | | |
|---|---|---|---|
| 1817569 | 8/1969 | Fed. Rep. of Germany | 428/178 |
| 1913250 | 9/1970 | Fed. Rep. of Germany . | |
| 2805848 | 8/1979 | Fed. Rep. of Germany . | |
| 1564910 | 3/1968 | France . | |
| 2282027 | 3/1976 | France . | |
| 52-25881 | 2/1977 | Japan | 47/17 |

Primary Examiner—John E. Murtagh
Attorney, Agent, or Firm—Merchant, Gould, Smith, Edell, Welter & Schmidt

[57] ABSTRACT

Proposed is a burl foil that can be installed as insulation in shed-like buildings, in particular greenhouses, where a Jalousie-like movement of the burl foil from an at-rest position into a use position is said to be possible, without that the required space for stacking the burl foil in the at-rest position be too large. Additionally proposed are attachment means for the burl foil to drawing means or wire ropes that are embodied as simply structured, commercially producible clamping parts that can also be installed by lay persons on any whatever burl foils.

7 Claims, 8 Drawing Figures

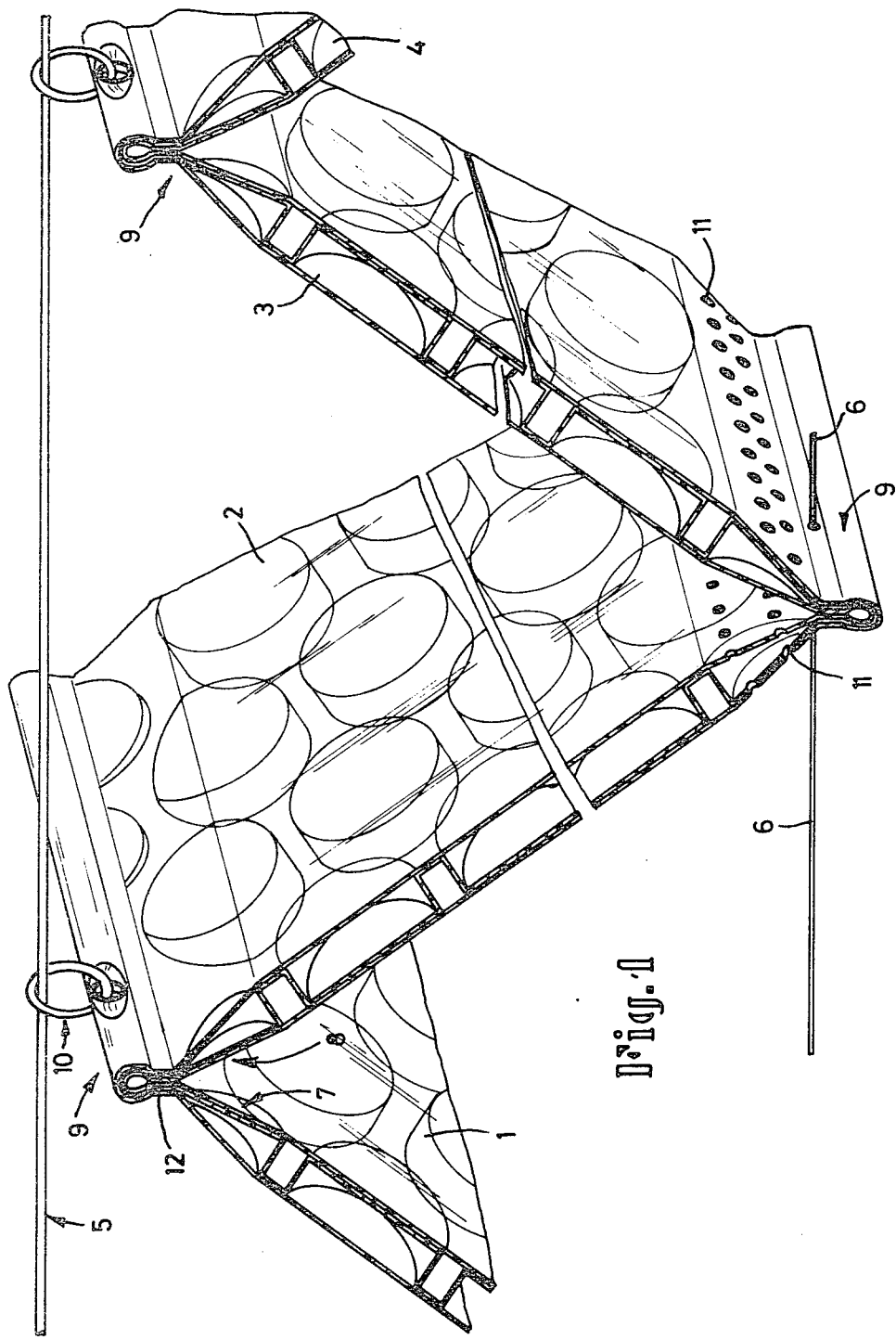

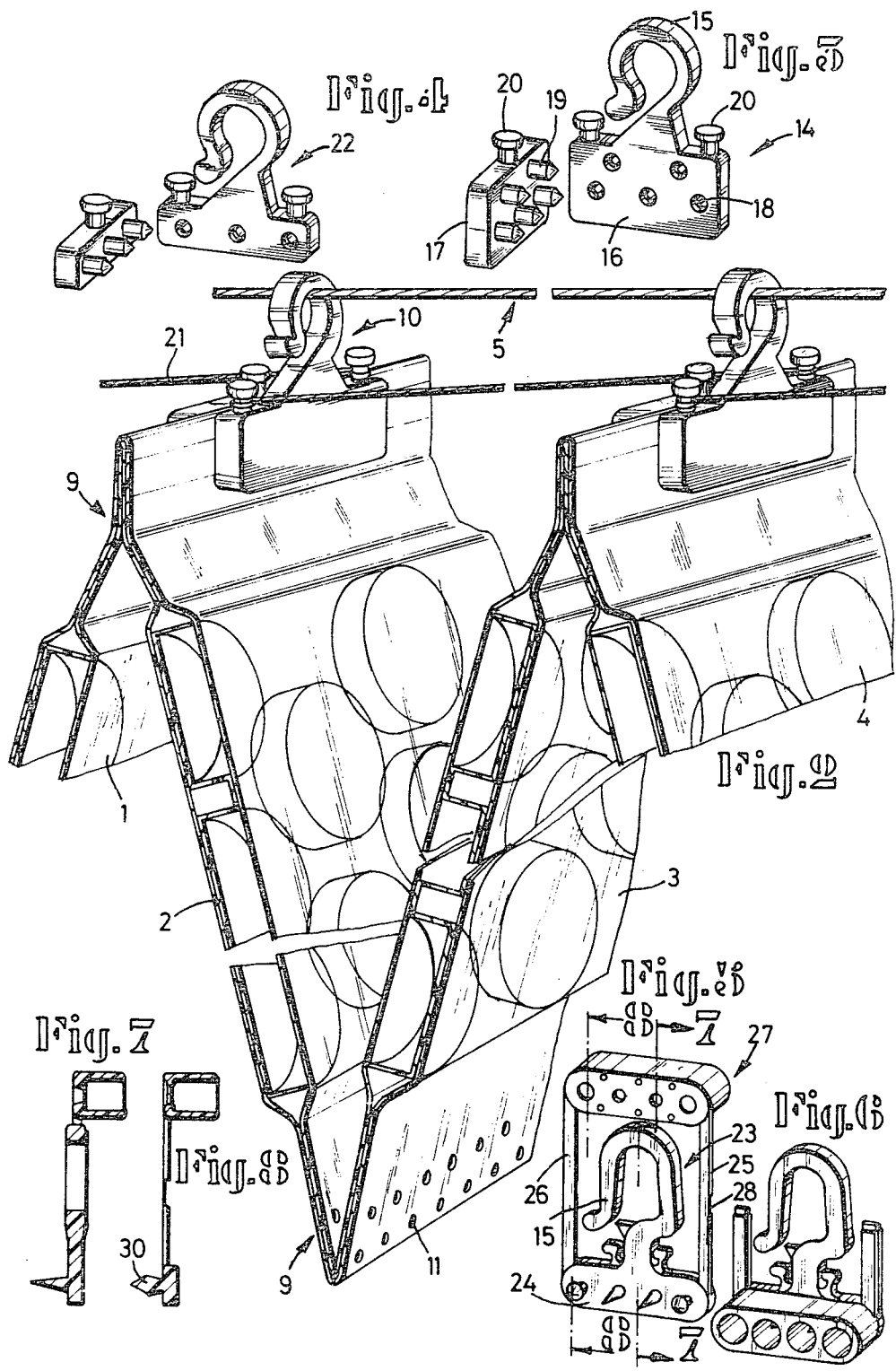

INSULATION OF SHED-LIKE BUILDINGS

The invention relates to an insulation for shed-like buildings, in particular greenhouses, in the region of roofs and walls that are usually structured essentially translucent.

Today, in greenhouses, it is to a great extent usual to cover over the glass side walls with so-called burl foils that consist of one or several foil strips with appropriate prominences which, because of the enclosed layers of air, provide a good insulation effect.

Up until now, however, these types of foil strips can not be disposed in the roof areas of greenhouses since rolling up of these types of foil strips would lead to large rolls that are no longer capable of being handled. And also, periodic removal of the foil strips is required since the foils are light-sensitive and take on coloration so that, because of this, the light yield into the greenhouses would be strongly obstructed if the burl foil strips remained continually disposed in the roof area. Additionally, burl foil strips continually disposed in the roof area would impair ventilation of the greenhouse.

Also, for the burl foil strips disposed in the region of the side walls, the need again presents itself of having the capability for attaching these burl foil strips higher or lower on the side walls. Here, capabilities for variation should be provided.

The task set forth for the invention will be resolved through means of measures mentioned in the claims, in particular by the fact that installed are multiple-layer burl foil strips that are arranged for being laid down or suspended in a to and fro movable fashion by drawing means, whereby these foils strips are rendered capable of folding zigzag fashion at pleated regions that are equidistant apart and perpendicular to their direction of movement. These pleated regions can, for example, be formed by flanges that are, in turn, obtained from welded cross pieces. The burls themselves can be destroyed in these pleated regions, however it is also completely possible to leave the burls in these pleated regions, in particular when dealing with relatively thin burl foil strips.

Guaranteed by means of this measure is a zigzag form of folding the burl foil strips, with the distance between the pleated regions being directed to the size and purpose of the desired fold. The center portion of the pleated region can be reenforced or also be structured simply, and serves, in any case, as a fastening and guide point.

Furthermore, in accordance with an essential feature of the invention, arranged in the pleated region are drainage and ventilation openings that serve for leading off water condensate and simultaneously enable a certain amount of air circulation behind the insulation also, whereby water condensate build-up is minimized.

These ventilation and drainage openings can be provided in the lower pleated regions as well as in the upper pleated regions.

As already stated, flanges can be obtained in the pleated region by means of welded cross pieces, it also being possible here, however, to install carrying capacity-increasing foils or narrow textile strips. Modifications are possible here without, in making them, taking leave of the basic idea of the invention.

In accordance with a further very essential feature of the invention, support and guidance of the foil strips is accomplished by use of attachment means serving for suspension that are structured as hooks, with the foot of the hook being advantageously structured as a plug-in component that consists of a hole plate and of a pin plate, with the pin or pins of the pin plate aligning with the hole or holes of the hole plate, and by pressing them together they hook and anchor in one another and, in this manner, after penetrating through the foil included between these two plates, clamp the foil without that it be possible to tear it out. By special forming of the pins, it can, in this fashion, be ensured that a certain contact pressure between the plate parts is established, which serves as a good support for the foil itself and, therewith, unloads the pricked hole.

Examples of embodiment of the invention will be explained in the following with the aid of the drawings. The drawings show in FIG. 1: a first form of embodiment, in FIG. 2: a modified form of embodiment, in FIGS. 3, 4 and 5 differently constructed hooks, in FIG. 6: the working position of the hook in accordance with FIG. 5, in FIG. 7: a cut along line 7—7 in FIG. 5, and in FIG. 8: a cut along line 8—8 in FIG. 5.

Designated with 1,2,3 and 4 in FIG. 1 are the folds of a burl foil strip that is suspended on a supporting contrivance 5. A drawing contrivance 6, which serves for the to and fro movement of the foil strip, i.e. folding and unfolding of the foil strip, can pass through the lower pleats.

The individual foil strip sections consist of burl foils that are known per se. In the case of the example of embodiment illustrated in FIG. 1, produced in the pleated region 9 are flat regions 7 and 8, for example by welding or some other process, that are separated by a reenforcing part 12, where the reenforcing part 12 can be obtained simply by appropriate welding pressure or also, however, lying within the scope of the invention, by installing in this region 12 an auxiliary reenforcing component such as, for example, a cord, a rod, a strip of fabric, or the like. Linked on the reenforcing part 12 are attachment and guidance means 10, which in the case of the example of embodiment illustrated in FIG. 1, are structured as rings with which the foil strip is suspended on the support contrivance 5. In the case of the example of embodiment illustrated in FIG. 1, the pleats are structured identical top and bottom.

Designated with 12 (sic) are small ventilation and drainage openings, arranged in the flat regions 7 and 8, that serve for leading off the water condensate and through means of which is simultaneously produced a reduction in condensate pressure behind the burl foil strip. These openings 11 can be provided in the top and/or bottom pleats.

The burl foil strip can be provided with insulation effect-increasing coatings and/or colorations. Hence, it is possible for example that the foil strip be vapor-deposited or coated with aluminum, whereby the insulation effect will be increased quite considerably.

To be seen from the construction illustrated in FIG. 1 is that a folding of still longer burl foil strips is possible, independent of whether these latter are located below the roof windows, or, for example, laid down or suspended lower down in the shed-like space, or on the walls, with folding being accomplished in a relatively small space so that, in this fashion, obtained for the first time is the capability of providing an insulation with burl foil strips inside of greenhouses also, with the foil strips capable of being installed or removed at will.

The direction in which the burl foil strips are arranged and moved inside the greenhouses is left to the local conditions.

The coating or vapor deposit aluminum can be provided on both sides of the foil strip so that the foil strip also serves as a cooling installation since, in Summer, the impinging rays of heat are reflected by the aluminum coating. In Winter, the aluminum coating on the inside of the foil causes the rays of heat from inside the greenhouse to be reflected back into this latter. By appropriate variation of the height of the support contrivance 5 inside the greenhouse, the height of the insulation layer, in order to adapt to the plants grown in the greenhouse, can be easily adjusted at will from inside the greenhouse.

To be pointed out finally is that obtainable simultaneously, through different coloration of the foil, is a shading system whereby, through means of the degree of coloration, the degree of sought-after shading can be determined.

In the form of embodiment illustrated in FIG. 2, the attachment and guidance means 10 is structured as hook components, with the hook components fulfilling a dual function, namely, on the one hand, connection of the foil strip to the support contrivance 5, on the other hand attaching of the attachment and guidance means 10 to the foil strip itself.

In a first form of embodiment in accordance with FIG. 3, provided is a hook part 14 displaying an open hook 15 and whose hook foot is structured as a plug-in component with a hole plate 16 and a pin plate 17. Provided in the hole plate 16 are holes 18, the sizes of which are adapted to the pins 19, so that the pins 19 can be locked in the holes 18. The pins are embodied tapering to a point and, therewith, can prick through the pleated region 9 of the foil strip and, in this fashion, clamp the foil strip tightly to the actual support part 10.

Additionally, the hook 14 is equipped with attachement buttons 20 that serve for connection of a drawing and spacing means. Capable of being accomplished with this drawing and spacing means is the opening and closing of the foil strip and, simultaneously, it is possible, by determining the length of the drawing means 21 between two hooks, to determine the opening width of the foil strip fold.

The hook 22 in FIG. 4 corresponds essentially to the construction of hook 14, it being only that the hole plate and pin plate are structured smaller.

The hook illustrated in FIG. 5 is differentiated from the hooks illustrated in FIGS. 3 and 4 by the fact that it is structured essentially of one piece. The hook 23 in accordance with FIG. 5 also displays an open hook 15 and a pin plate 24 constructed on the foot of the hook. Additionally provided are connecting bars 25 and 26 that support the hole plate 27, with a notched region 28 being provided in the middle of bars 25 and 26 that makes possible a simple bending around of this hole plate and a meeting with the pins. Then the holes of hole plate 27 line up with the pins of pin plate 24 and, here again, a firm clamping of the foil can be accomplished. In this manner, loss of the pin plate or of the hole plate is no longer possible and the hook is always ready for use.

As shown in particular by the cut drawings in FIGS. 7 and 8, the pins are structured tapering to a point and, in particular, the pin or pins 30 are embodied such that locking of the pin plate to the hole plate results, so that, in this fashion, by appropriate selection of size of the locking component, a firm clamping of the plates to one another is achieved, through which means the foil included between them is also firmly clamped and, in this fashion, the pressure of suspension of the foil is distributed over the entire clamping area and, therewith, the holes produced in the foil by the pin components are unloaded.

We claim:

1. Insulation adapted for use in a greenhouse-type building, said building having a side, said insulation including:

a plurality of multiple layer burl foil strip sections disposed along said side of said building, each burl foil strip section having a top and a bottom and constructed to be folded at substantially equidistant intervals creating pleated regions in said section substantially normal to a first direction and to second reverse direction of section movement, each said pleated region including flange means for reinforcing said pleated section region, said flange means including welded cross piece members;

each said pleated region formed by joining two adjacent burl foil strip sections at their respective said bottoms with one of said crossmembers, adjacent pleated regions being joined together at the respective said tops of said burl foil strip sections with one of said crossmembers;

drawing means attached to each of said sections adjacent said side of said building for moving said sections in a first direction and then in a reverse second direction along said side; and attachment means for operatively securing said foil strip sections to said drawing means.

2. Insulation according to claim 1 wherein a portion of each said pleated region supports a portion of said attachment means.

3. Insulation according to claim 2 wherein said attachment means includes a hook portion and a clamp portion, said clamp portion is secured to said portion of said pleated region; said hook portion includes a foot end, said foot end having a hole plate with spaced apart openings therein, and a pin plate having a plurality of spaced-apart pins projecting therefrom, said pins are constructed to be plugged into said openings in said hole plate whereby said pins are anchored in said hole plate.

4. Insulation according to claim 3 wherein each said attachment means further includes a pair of spaced-apart connecting brackets, each said bracket is secured intermediate said pin plate and said hole plate.

5. Insulation according to claim 4 wherein each said connecting bracket includes a notched portion whereby said bracket can be inclined to allow said hole plate to be aligned with said pin plate, each said hook portion further includes attachment button means for connecting said attachment means to said drawing means.

6. Insulation according to claim 1 further including a coating applied to each said foil strip section whereby the degree of insulation provided each said section is increased.

7. Insulation according to claim 1 wherein each said pleated region includes a portion containing outlet means for draining and ventilating said foil strip section, said outlet means located adjacent said crossmembers at said respective bottoms of each of said burl foil strip sections.

* * * * *